(12) United States Patent
Mobin et al.

(10) Patent No.: US 8,208,521 B2
(45) Date of Patent: Jun. 26, 2012

(54) METHODS AND APPARATUS FOR DETECTING A LOSS OF LOCK CONDITION IN A CLOCK AND DATA RECOVERY SYSTEM

(75) Inventors: Mohammad S. Mobin, Orefield, PA (US); Gregory W Sheets, Breinigsville, PA (US); Lane A. Smith, Easton, PA (US); Paul H. Tracy, Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 1141 days.

(21) Appl. No.: 11/967,632

(22) Filed: Dec. 31, 2007

(65) Prior Publication Data

US 2009/0168936 A1 Jul. 2, 2009

(51) Int. Cl.
*H04B 17/00* (2006.01)
(52) U.S. Cl. ........................................ 375/224
(58) Field of Classification Search .......... 375/354, 375/350, 355, 340, 371, 360, 362, 229, 230, 375/232, 233, 316, 346, 224, 226–228, 359; 327/50, 58, 91, 94
See application file for complete search history.

(56) References Cited

U.S. PATENT DOCUMENTS

| | | | |
|---|---|---|---|
| 5,521,941 A * | 5/1996 | Wiatrowski et al. | 375/287 |
| 6,785,354 B1 * | 8/2004 | Dietrich | 375/373 |
| 6,987,817 B1 * | 1/2006 | Reuveni | 375/340 |
| 7,016,447 B1 * | 3/2006 | Reuveni | 375/371 |
| 7,139,348 B1 * | 11/2006 | Fu et al. | 375/376 |
| 7,418,068 B2 * | 8/2008 | Barrett et al. | 375/355 |
| 7,437,079 B1 * | 10/2008 | Hofmeister et al. | 398/138 |
| 7,532,676 B2 * | 5/2009 | Fonseka et al. | 375/265 |
| 7,596,196 B1 * | 9/2009 | Liu et al. | 375/354 |
| 7,743,288 B1 * | 6/2010 | Wang | 714/704 |
| 2002/0085656 A1 | 7/2002 | Lee et al. | |
| 2002/0126784 A1 * | 9/2002 | Brazeau et al. | 375/371 |
| 2004/0193970 A1 * | 9/2004 | Dietrich et al. | 714/700 |
| 2004/0201428 A1 * | 10/2004 | Kenney et al. | 331/16 |
| 2005/0111845 A1 * | 5/2005 | Nelson et al. | 398/138 |
| 2007/0058988 A1 * | 3/2007 | Yonenaga | 398/186 |
| 2008/0031385 A1 * | 2/2008 | Aung et al. | 375/316 |
| 2009/0110045 A1 * | 4/2009 | Aziz et al. | 375/232 |
| 2009/0110046 A1 * | 4/2009 | Aziz et al. | 375/232 |

* cited by examiner

*Primary Examiner* — Tesfaldet Bocure
(74) *Attorney, Agent, or Firm* — Ryan, Mason & Lewis, LLP

(57) ABSTRACT

Methods and apparatus are provided for detecting a loss of lock condition in a clock and data recovery system. A loss of lock condition is detected in a clock and data recovery system that generates a recovered clock signal from a received signal by sampling the received signal for a plurality of different phases using one or more latches clocked by the recovered clock; evaluating the samples to monitor a data eye associated with the received signal; and detecting the loss of lock condition if the data eye does not satisfy one or more predefined conditions. Generally, the predefined conditions identify a loss of the data eye (e.g., when the data eye cannot be substantially detected), for example, based on a degree of opening of the data eye. The clock and data recovery system can optionally be restarted if the loss of lock condition is detected.

18 Claims, 3 Drawing Sheets

METHODS AND APPARATUS FOR DETECTING A LOSS OF LOCK CONDITION IN A CLOCK AND DATA RECOVERY SYSTEM

FIELD OF THE INVENTION

The present invention is related to techniques for clock and data recovery in a communication system and, more particularly, to techniques for detecting a loss of lock condition in a clock and data recovery system.

BACKGROUND OF THE INVENTION

Digital communication receivers typically must sample an incoming waveform and then reliably detect the sampled data. Typically, a receiver includes a Clock and Data Recovery (CDR) system to recover the clock and data from an incoming data stream. The CDR system generates a clock signal having the same frequency and varying phase as the incoming signal, which is then used to sample the received signal and detect the transmitted data.

CDR systems often employ well-known multiple stage proportional-integral (PI) digital loop filters, typically having multiple integrators in series. In a second order filter, for example, the first integrator includes a proportional register (PREG), and the second integrator includes an integral register (IREG), in a known manner. The CDR system recovers or locks to an initially unknown phase offset and frequency offset present in the incoming signal The integral state of the loop is directly related to the frequency offset The integral register is typically initialized to a value of zero (0) and the integral register value will eventually converge to a value that is proportional to the frequency of offset.

When a CDR is in a locked state, the sampling latches see a time stationary NRZ signal As a result, the Decision Feedback Equalization (DFE) eye opening can be calculated by comparing (for example, using an exclusive-or operation (XOR)) the decision latch output with the output of a vertical roaming latch, constrained with N-previous bits. See, fox example, U.S. patent application Ser. No. 11/540,946, filed Sep. 29, 2006, entitled "Method And Apparatus For Determining Latch Position For Decision-Feedback Equalization Using Single-Sided Eye," for a discussion of DFE eyes. If the CDR loses the locked state, however, the NRZ signal is not time stationary. The CDR will start to diverge from the sampling clocks. When a CDR is out of lock, the CDR loop may build up the wrong values for the integral and proportional registers (IREG and PREG) Conventional techniques have used integral register (IREG) or proportional register (PREG) variability as an indication of CDR loss detection. Such conventional techniques, however, may confuse integral or proportional register variability with actual parts-pet-million (ppm) deviation A need exists for methods and apparatus for detecting a loss of lock condition in a clock and data recovery system. A further need exists for methods and apparatus that take corrective action to restore a locked condition in a clock and data recovery system.

SUMMARY OF THE INVENTION

Generally, methods and apparatus are provided for detecting a loss of lock condition in a clock and data recovery system. According to one aspect of the invention, a loss of lock condition is detected in a clock and data recovery system that generates a recovered clock signal from a received signal by sampling the received signal for a plurality of different phases using one or more latches clocked by the recovered clock; evaluating the samples to monitor a data eye associated with the received signal; and detecting the loss of lock condition if the data eye does not satisfy one or more predefined conditions For example, the one or more predefined conditions can ensure that the recovered clock phase has a deterministic sampling phase on a unit interval (UI) of the received signal when the clock and data recovery system is in a locked condition Thus, the one or more predefined conditions detect when the recovered clock phase has a non-deterministic sampling phase on a unit interval (UI) of the received signal due to a loss of lock condition. More generally, the one or more predefined conditions identify a loss of the data eye (e g, when the data eye cannot be substantially detected), for example, based on a degree of opening of the data eye. The clock and data recovery system can optionally be restarted if the loss of lock condition is detected.

A mole complete understanding of the present invention, as well as further features and advantages of the present invention, will be obtained by reference to the following detailed description and drawings.

DETAILED DESCRIPTION

Figure 1:
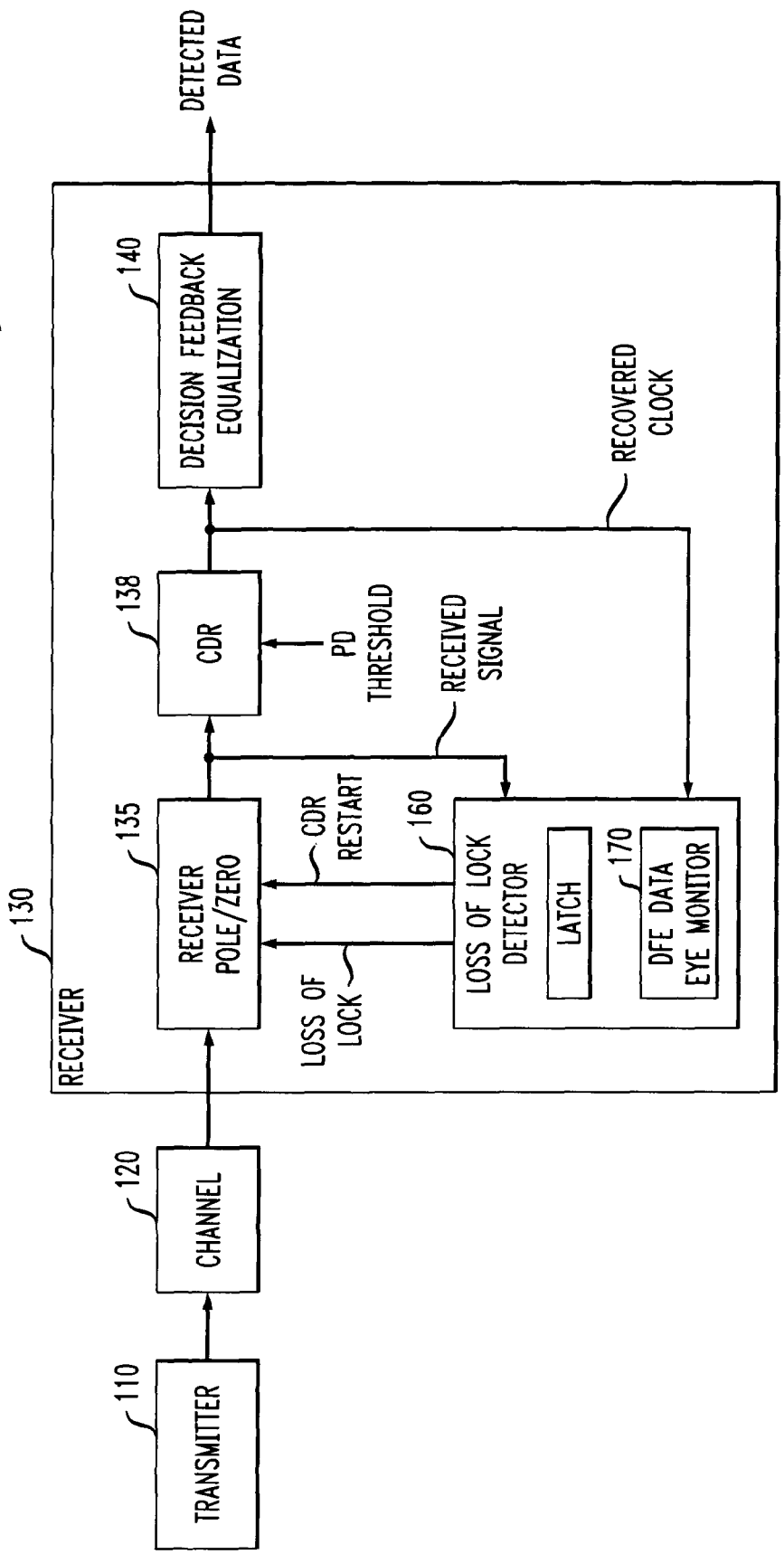
FIG. 1 is a block diagram of a communication system in which the present invention can operate.

The present invention provides methods and apparatus for detecting a loss of lock condition in a clock and data recovery system. FIG. 1 is a block diagram of a communication system 100 As shown in FIG. 1, a transmitter 110 transmits data over a channel 12 for receipt by a receiver 130 Pre-emphasis techniques (not shown) are optionally applied in the transmitter 110 before the signal is transmitted over the channel 120. In addition, equalization techniques 135, such as zero equalization 135 and decision feedback equalization (DFE) 140 are optionally applied in the receiver 130.

As previously indicated, a received, such as the receiver 130, typically includes a Clock and Data Recovery (CDR) system 138 to recover the clock and data from the incoming data stream (received signal) The CDR system 138 generates a clock signal having the same frequency and varying phase as the received signal, which is then used to sample the received signal and detect the transmitted data. In this situation, the recovered clock at the output of the CDR 138 and the received data at the input of the CDR 138 will be synchronized with each other. As a result, the recovered clock phase will maintain a deterministic sampling phase on a unit interval (UI) of the incoming data.

A CDR, such as the CDR 138, can lose lock for various reasons, e.g., (1) in the presence of spectrally poor incoming data, or (2) in a threshold-based phase detector, where the phase detector (PD) threshold is raised above the signal. When a CDR loses lock, the recovered clock frequency will not have the same frequency as the incoming data. As a result, the recovered clock phase will not be deterministic over a UI of the incoming data.

According to one aspect of the invention, the receiver 130 includes a loss of lock detector 160, to automatically determine if the CDR 138 loses the locked condition. As shown in FIG. 1 and discussed further below, the disclosed loss of lock detection techniques are based on a DFE data eye monitor 170. The DFE data eye monitor 170 may be embodied, for example, using the techniques described in U.S. Pat. No. 7,711,043, entitled "Method And Apparatus For Determining Latch Position For Decision-Feedback Equalization Using Single-Sided Eye," incorporated by reference herein.

A small data eye is typically the result of channel distortions that tend to close the data eye. Generally, a DFE eye, also referred to as a single-sided eye, provides an improved mechanism for monitoring the data eye by containing only transitions from one binary value (i e, only 1→x or 0→x transitions). The DEE eye techniques recognize that a DFE eye can be more easily observed by constraining the data to only contain signal transitions from, for example, a binary value 1 to a binary value of 0 or 1 (referred to as 1→x), and inhibiting any signal transitions from a binary value of 0.

Figure 2:
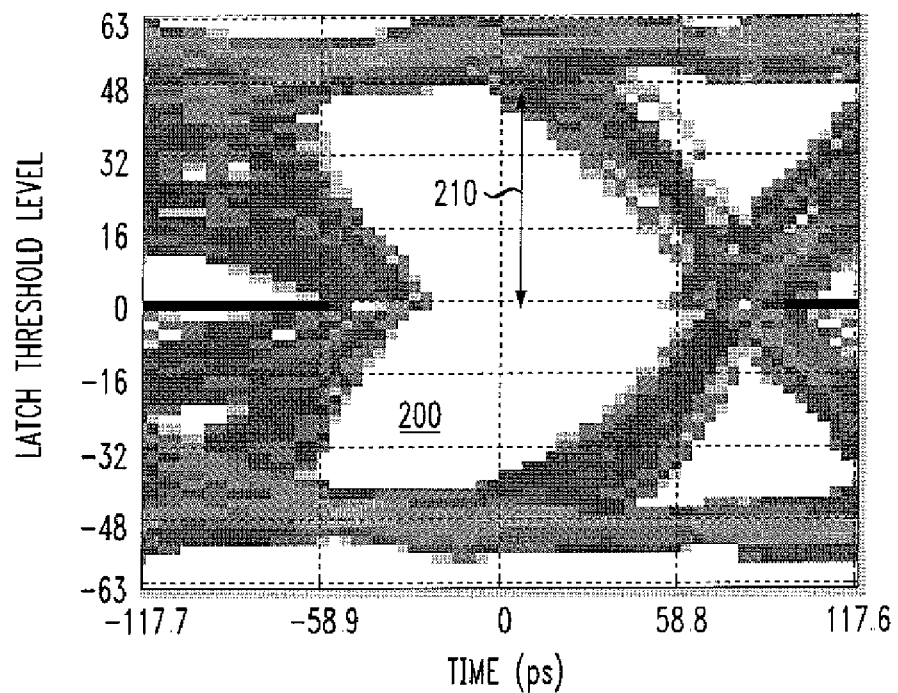
FIGS. 2 through 4 illustrate a DFE eye when the clock and data recovery system 100 is in various stages between a locked and loss of lock states.
Figure 3:
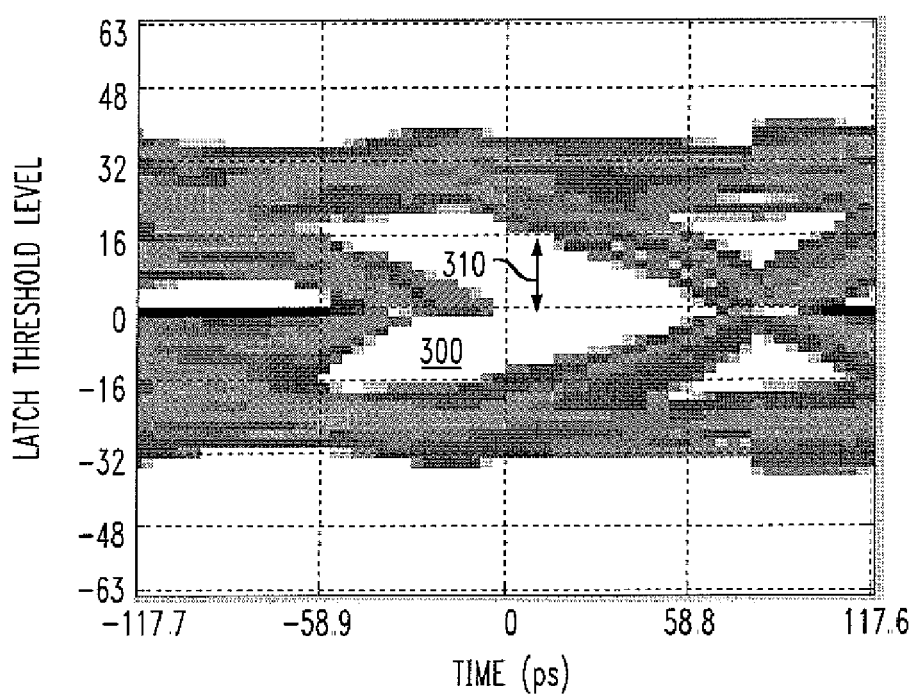

As previously indicated, if a CDR loses a locked state, the NRZ signal is not time stationary and the recovered clock will start to diverge from the UI sampling phase from one sample to the next sample. The time varying unrecovered clock will sample the UI of the incoming data at different phases on the data UI. Since the unrecovered clock and input data phase are no longer stationary, the statistics from the data eye monitor that were designed to be collected at a given phase, will rather be collected for a walking phase The data eye monitor thus provides average eye data across every phase The present invention thus recognizes that the DEE eye will cease to exist when there is a loss of lock. A loss of DFE eye can be detected, for example, when the eye opening fails to meet one or more predefined criteria, such as a minimum height or a minimum width The present invention further recognizes that the DFE eye information can be used to detect a loss of lock in a clock and data recovery system If a loss of lock is detected, another aspect of the invention restarts the CDR to restore proper operation FIG. 2 illustrates a DFE eye 200 when the clock and data recovery system 138 in a locked state When the CDR input amplitude is large and the signal is properly equalized, the CDR 138 can easily lock to the incoming signal and stay locked as long as the spectrally rich signal is present (or the phase detector threshold voltage is within the eye limit). As shown in FIG. 2, the exemplary DEE eye 200 has a large eye opening or amplitude 210. When such a distinct eye opening 210 is present, the relative input NRZ data and the sampling clock frequency are synchronized. This makes the eye 200 stationary with respect to the sampling clocks, thereby allowing measurement of the distinct eye opening 210, which is indicative of a normal locked CDR operation As the signal amplitude degrades and an un-equalized signal reaches the CDR sampling latches, the CDR operation becomes challenging. Fox a small amplitude signal, the DFE eye 300 is small, as shown in FIG. 3. As a result, sampling latch threshold quantization error starts to become significant. In addition, the phase detector latch threshold starts to become sensitive, as indicated above. Thus, the phase detector output becomes unreliable. Thus, the DFE threshold and phase detector threshold placement percentage error increases As the DFE and transition latch threshold placement percentage error increases, the possibility of the CDR becoming out of lock is also increased. As shown in FIG. 3, the signal amplitude 310 is reduced, making the DFE threshold placement range smaller.

Figure 4:
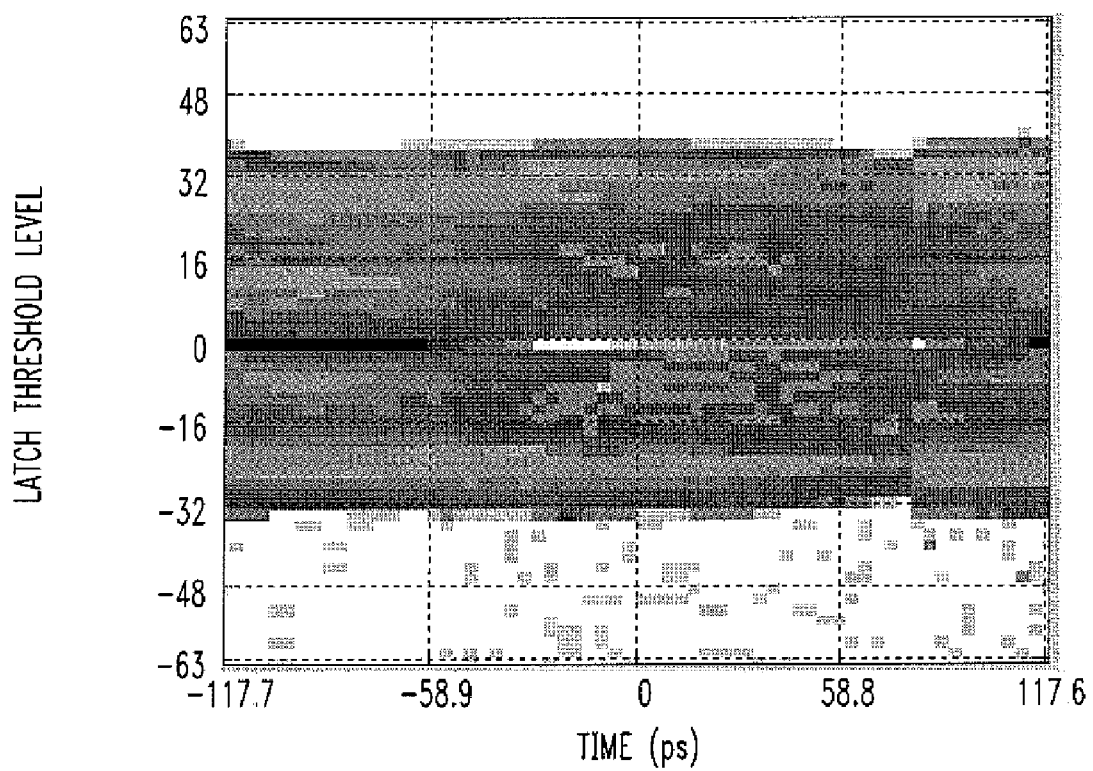

FIG. 4 illustrates a DFE eye 400 with DFE latch threshold placement error. As the sampling and transition latch threshold placement error is increased, at some point the CDR loses lock. During the CDR loss of lock state, the incoming signal is not stationary with respect to the sampling clocks As a result, the DUE eye 400 cannot be measured. Thus, it can be seen in FIG. 4 that there is no visible the DFE eye 400

As part of the equalization process, the loss of lock detector 160 calculates the height of the DFE eye, such as the height 210 of the DFE eye 200 of FIG. 2. In the presence of a loss of lock condition, the calculated DFE eye will be absent As indicated above, a DFE eye is calculated by collecting statistics fox various unique sampling phases. In the case of a loss of lock, the statistics will be the average of the various uncorrelated phases. This data, when used for calculating the DYE eye, will not reveal a DFE eye (i.e., no amplitude opening). When the calculated height of the DFE eye is zero or approximately zero, it indicates a CDR loss of lock status. Upon detecting a loss of lock status, the loss of lock detector 160 can optionally initiate a CDR restart sequence.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses fox practicing those methods. One or mote aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention When implemented on a general-purpose processor; the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention

We claim:

1. A method for detecting a loss of lock condition in a clock and data recovery system that generates a recovered clock signal from a received signal, comprising:

sampling said received signal for a plurality of different phases using one or more latches clocked by said recovered clock;

evaluating said samples to monitor a data eye associated with said received signal; and detecting said loss of lock condition if a result of said data eye monitoring does not satisfy one or more predefined conditions, wherein said one or more predefined conditions detect when said data eye cannot be substantially detected based on a degree of opening of said data eye, wherein said data eye monitoring is based on statistics of the received signal.

2. The method of claim 1, wherein said one or more predefined conditions ensure that said recovered clock and said received signal are substantially synchronized with one another for a locked condition.

3. The method of claim 1, wherein said one or more predefined conditions ensure that said recovered clock phase has a deterministic sampling phase on a unit interval (UI) of said received signal when said clock and data recovery system is in a locked condition.

4. The method of claim 1, wherein said one or more predefined conditions detect when said recovered clock phase has a non-deterministic sampling phase on a unit interval (UI) of said received signal due to a loss of lock condition.

5. The method of claim 1, wherein said one or more predefined conditions identify a loss of said data eye.

6. The method or claim 1, wherein said one or more predefined conditions detect when said data eye cannot be substantially detected.

7. The method of claim 1 wherein said data eye is a single-sided data eye.

8. The method of claim 7, wherein said single-sided data eye only contains transitions from a first binary value to a binary value of 0 or 1.

9. The method of claim 1, further comprising the step of restarting said clock and data recovery system if said loss of lock condition is detected.

10. A loss of lock detector in a clock and data recovery system that generates a recovered clock signal from a received signal, comprising:
one or more latches clocked by said recovered clock for sampling said received signal for a plurality of different phases;
a data eye monitor for evaluating said samples to monitor a data eye associated with said received signal; and
means for detecting a loss of lock condition if a result of said data eye monitoring does not satisfy one or more predefined conditions, wherein said one or more predefined conditions detect when said data eye, wherein said data eye monitoring is based on statistics of the received signal cannot be substantially detected based on a degree of opening of said data eye.

11. The apparatus of claim 10, wherein said one or more predefined conditions ensure that said recovered clock phase has a deterministic sampling phase on a unit interval (UI) of said received signal when said clock and data recovery system is in a locked condition.

12. The apparatus of claim 10, wherein said one or more predefined conditions detect when said recovered clock phase has a non-deterministic sampling phase on a unit interval (VI) of said received signal due to a loss of lock condition.

13. The apparatus of claim 10, wherein said one or more predefined conditions identify a loss of said data eve.

14. The apparatus of claim 10, wherein said one or more predefined conditions detect when said data eye cannot be substantially detected.

15. The apparatus of claim 10, wherein said data eve is a single-sided data eye.

16. The apparatus of claim 15, wherein said single-sided data eye only contains transitions from a first binary value to a binary value of 0 or 1.

17. The apparatus of claim 10, further comprising means for restarting said clock and data recovery system if said loss of lock condition is detected.

18. A clock and data recovery system that generates a recovered clock signal from a received signal, comprising:
one or more latches clocked by said recovered clock for sampling said received signal for a plurality of different phases;
a data eye monitor for evaluating said samples to monitor a data eye associated with said received signal; and
a loss of lock detector for detecting a loss of lock condition if a result of said data eye monitoring does not satisfy one or more predefined conditions, wherein said one or more predefined conditions detect when said data eve cannot be substantially detected based on a decree of opening of said data eve, wherein said data eye monitoring is based on statistics of received signal.

* * * * *

UNITED STATES PATENT AND TRADEMARK OFFICE
CERTIFICATE OF CORRECTION

PATENT NO.      : 8,208,521 B2
APPLICATION NO. : 11/967632
DATED           : June 26, 2012
INVENTOR(S)     : Mohammad S. Mobin et al.

Page 1 of 1

It is certified that error appears in the above-identified patent and that said Letters Patent is hereby corrected as shown below:

In the Claims

Column 5, claim 10, lines 32-35, which reads: "detect when said data eye, wherein said data eye monitoring is based on statistics of the received signal cannot be substantially detected based on a degree of opening of said data eye." should read --detect when said data eye cannot be substantially detected based on a degree of opening of said data eye, wherein said data eye monitoring is based on statistics of the received signal.--.

Column 6, claim 13, line 9, which reads: "data eve." should read --data eye.--; claim 15, line 13, which reads: "data eve is" should read --data eye is--; claim 18, line 31, which reads: "said data eve" should read --said data eye--; claim 18, line 32, which reads: "on a decree of" should read --on a degree of--; claim 18, line 33, which reads: "said data eve," should read --said data eye,--; claim 18, line 34, which reads: "statistics of received" should read --statistics of the received--.

Signed and Sealed this
Twenty-second Day of October, 2013

Teresa Stanek Rea
*Deputy Director of the United States Patent and Trademark Office*